W. H. INMAN.
GARDEN IMPLEMENT.
APPLICATION FILED FEB. 21, 1919.
1,320,861.
Patented Nov. 4, 1919.
2 SHEETS—SHEET 1.
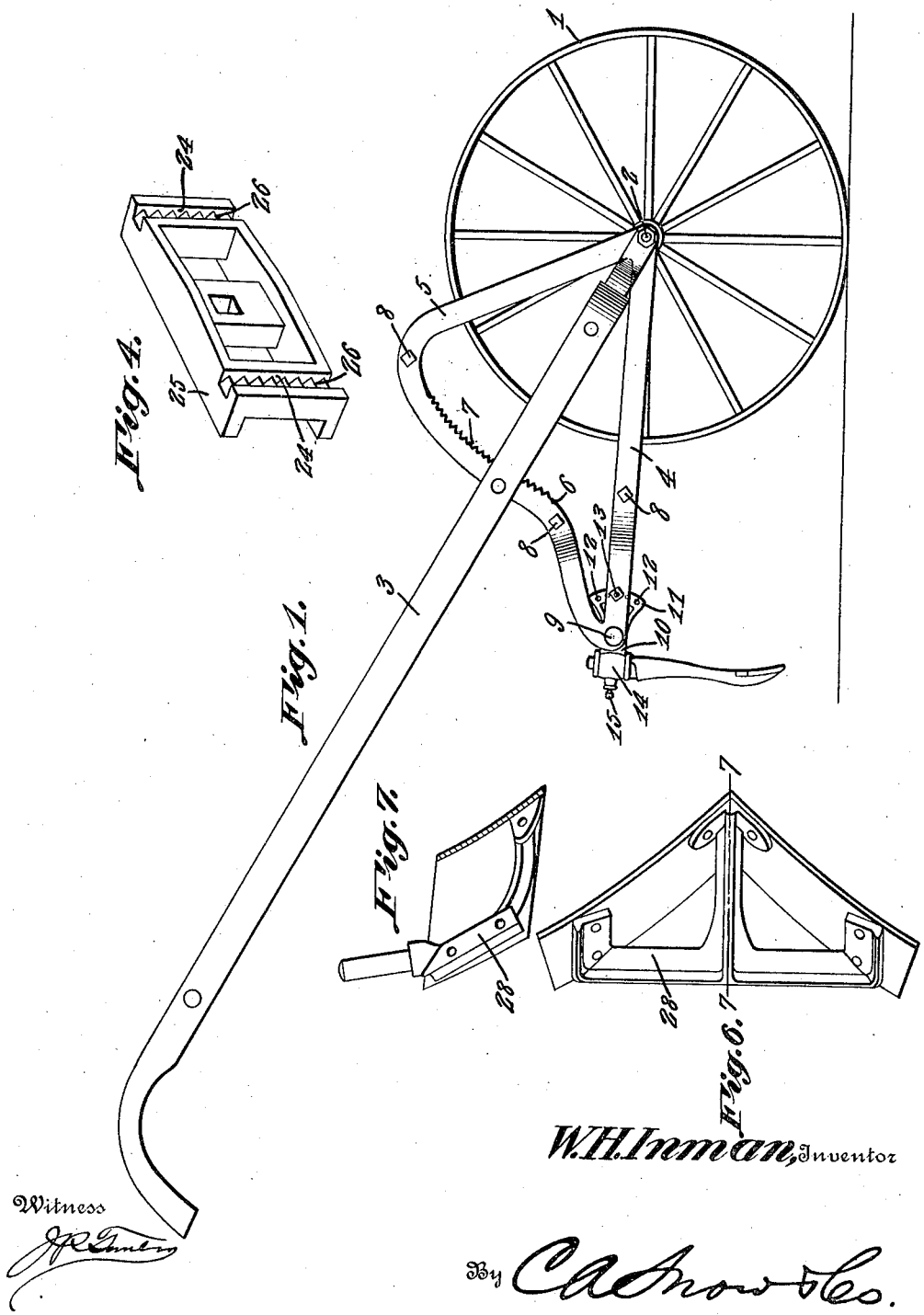
W.H.Inman, Inventor

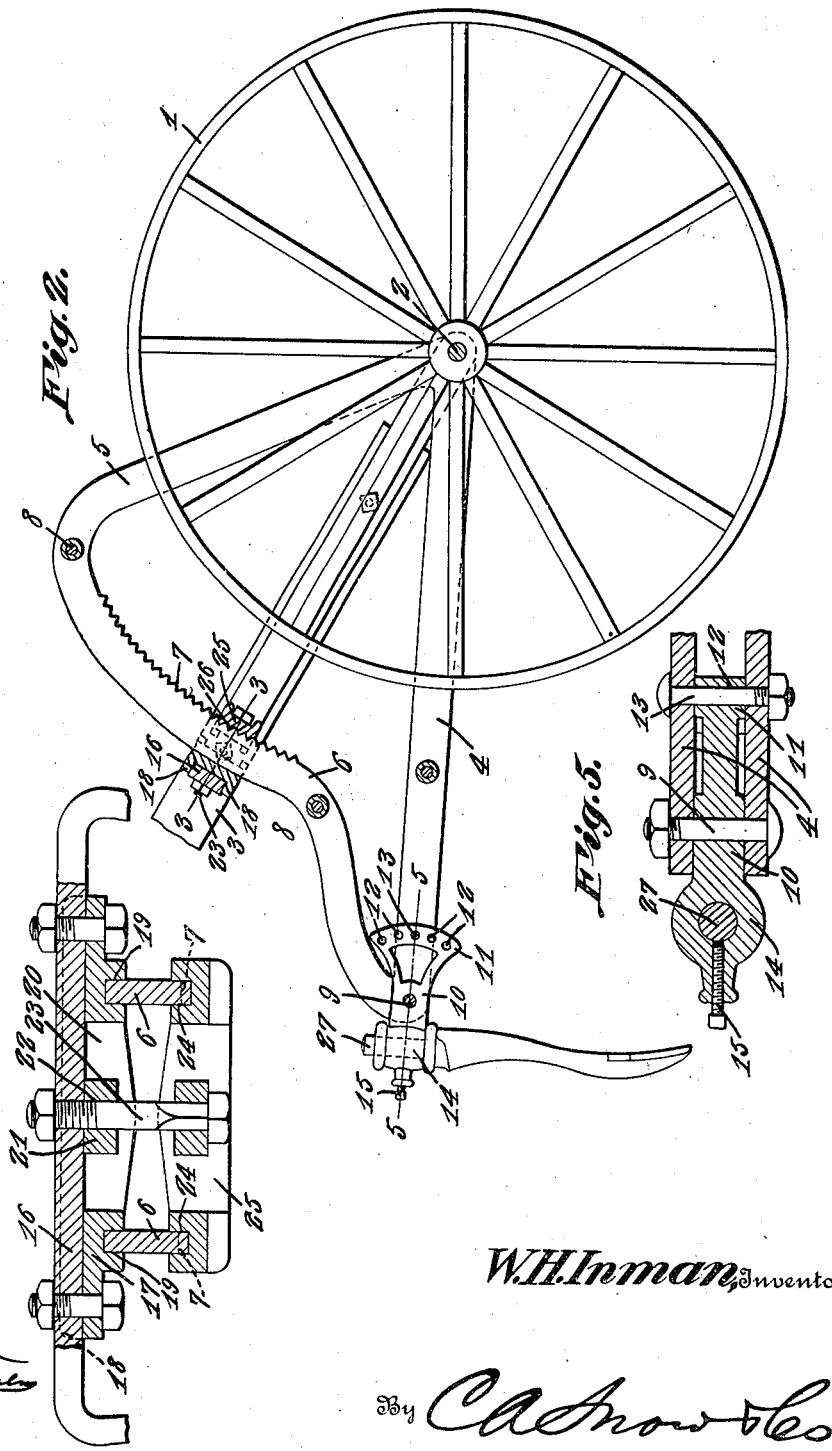

UNITED STATES PATENT OFFICE.

WILLIAM HARRY INMAN, OF KEOKUK, IOWA.

GARDEN IMPLEMENT.

1,320,861.   Specification of Letters Patent.   Patented Nov. 4, 1919.

Application filed February 21, 1919. Serial No. 278,410.

*To all whom it may concern:*

Be it known that I, WILLIAM H. INMAN, a citizen of the United States, residing at Keokuk, in the county of Lee and State of Iowa, have invented a new and useful Garden Implement, of which the following is a specification.

This invention relates to a garden implement of that type adapted to be pushed by the user, one of its objects being to provide a device of this character having simple and efficient means for adjusting the handles relative to the frame.

A further object is to provide simple and durable means for attaching ground engaging tools of different kinds to the frame of the device so that they can be adjusted to any desired positions relative to the surface of the ground.

Another object is to provide a structure of this character which will not easily get out of order, is durable, and can be manipulated readily for a number of purposes.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a side elevation of the device having a harrow attachment secured thereto.

Fig. 2 is an enlarged view, partly in side elevation and partly in section showing the adjustable connections between the parts.

Fig. 3 is an enlarged section on line 3—3, Fig. 2.

Fig. 4 is a perspective view of one of the clamping blocks shown in Fig. 3.

Fig. 5 is a section on line 5—5, Fig. 2.

Fig. 6 is a bottom plan view of one form of plow attachment that may be used with the device.

Fig. 7 is a section on line 7—7, Fig. 6.

Referring to the figures by characters of reference, 1 designates a supporting wheel carrying an axle 2 the ends of which are secured within the front ends of rearwardly diverging handle members 3. Mounted for annular adjustment on the axle 2 is a frame made up of side members 4 which converge rearwardly and are provided with upper portions 5 preferably integral therewith. Each of these upper portions is inclined upwardly and rearwardly from the front end of the frame and is then extended downwardly along the lines of an ogee curve, as shown at 6, merging at its rear end into the rear end of the frame. The upper portions of the ogee curves are concentric with the axle 2 and are provided with teeth 7 along the front edges thereof. Both sides of the frame are connected at suitable points by cross bolts or rivets 8 and the rear portions of the sides of the frame are connected by a pivot member 9. An arm 10 is mounted on the member 9 and is provided at its front end with a segment 11 having a series of apertures 12 any one of which is adapted to receive a detachable bolt 13. Thus it will be seen that the arm 10 can be adjusted angularly and can be held in any position to which it may be adjusted. The rear end of the arm is provided with a sleeve 14 having a set screw 15 extending thereinto.

The handles 3 are connected by a cross strip 16 located back of but close to the toothed portions and bolted or otherwise secured to this strip is a stationary clamping block 17 having upper and lower flanges 18 forming a channel therebetween in which the cross strip 16 is seated. Parallel grooves 19 are formed in the front face of the block and located between these grooves is an opening 20 provided with a central cross member 21 having a hole 22 into which extends a bolt 23 which also passes through the strip 16, as shown in Fig. 3. The grooves 19 are adapted to receive the rear edges of the upwardly extending portions 6 and the front or toothed edges of said portions are adapted to extend into grooves 24 formed in another clamping block 25, there being teeth within said grooves, as shown at 26 for engaging the teeth 7. The middle portion of the block 25 is engaged by the bolt 23 so that by tightening said bolt the two blocks 17 and 25 will clamp upon the portions 6 and hold the frame 4 against movement relative to the handles 3. By loosening the bolt 23, however, the block 25 can be disengaged from the teeth 7 and the frame 4 adjusted angularly to raise or lower the rear end thereof relative to the handles.

The sleeve 14 is adapted to receive a stem 27 extending upwardly from a ground engaging tool of any form desired. For example, and as shown in Figs. 1 and 2 the stem can extend upwardly from a cultivating rake, or, as shown in Figs. 6 and 7, it can be formed with a casting 28 to which are secured the point and wings of a furrow opener. Plows, bull tongues, hoes, etc., can all be used with the device simply by providing them with stems 27 which, when inserted into the sleeve 14, are clamped and held by the screw 15.

What is claimed is:—

1. The combination with a wheel supported axle, and connected handles mounted for angular adjustment upon the axle, of a frame connected at one end to the axle, an upwardly extending portion upon the frame including a toothed arcuate portion, opposed clamping members interposed between and connected to the handles and having grooves for the reception of said arcuate portion, there being teeth in one of the grooves for engagement with the teeth on said arcuate portion, and means for clamping the members upon said portion.

2. The combination with a wheel supported axle, and handles mounted for angular adjustment relative to the wheel, of a cross strip connecting the handles, a clamping block having a channel in which the cross strip is seated, said block and strip being connected together, a frame having an arcuate portion extending between the handles, a second clamping block having a groove for the reception of said arcuate portion, means for detachably connecting the blocks and binding them upon opposed portions of the arcuate portion, and teeth in said groove and on the arcuate portion coöperating to hold the frame and handles against relative movement.

3. The combination with a wheel supported axle, spaced handles mounted for angular adjustment relative to the wheel, and an angularly adjustable frame mounted at one end on the axle and having an upwardly extending arcuate portion, of a connection between the handles, and opposed, detachably connected clamping blocks connected to said connection, there being opposed grooves within the blocks for the reception of opposed portions of said arcuate portion of the frame.

In testimony that I claim the foregoing as my own, I have hereto affixed my signature in the presence of two witnesses.

WILLIAM HARRY INMAN.

Witnesses:
HENRY REICHMAN,
JAS. S. BURROWS.

Copies of this patent may be obtained for five cents each, by addressing the "Commissioner of Patents, Washington, D. C."